April 28, 1970　　　D. B. COLBECK ET AL　　　3,508,971
WATER ACTIVATED BATTERY
Filed June 7, 1967　　　　　　　　　　　　　　2 Sheets-Sheet 1
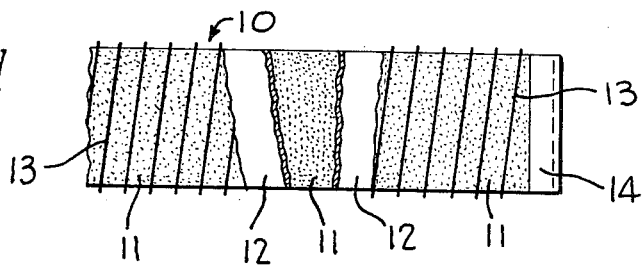
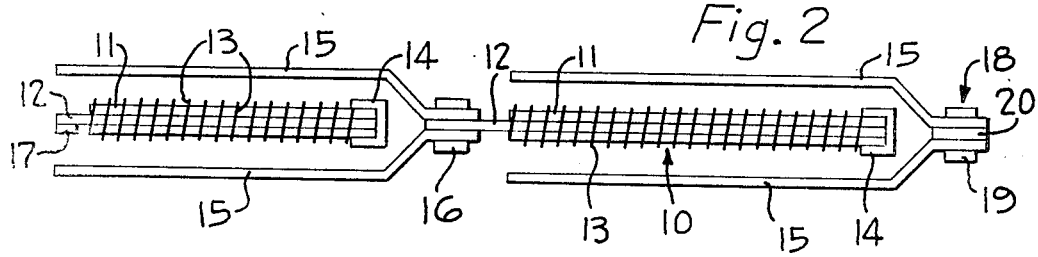
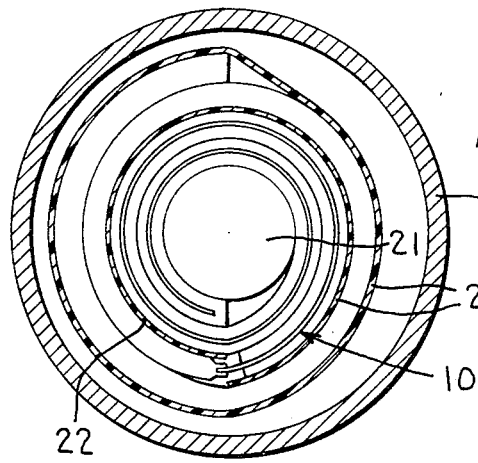
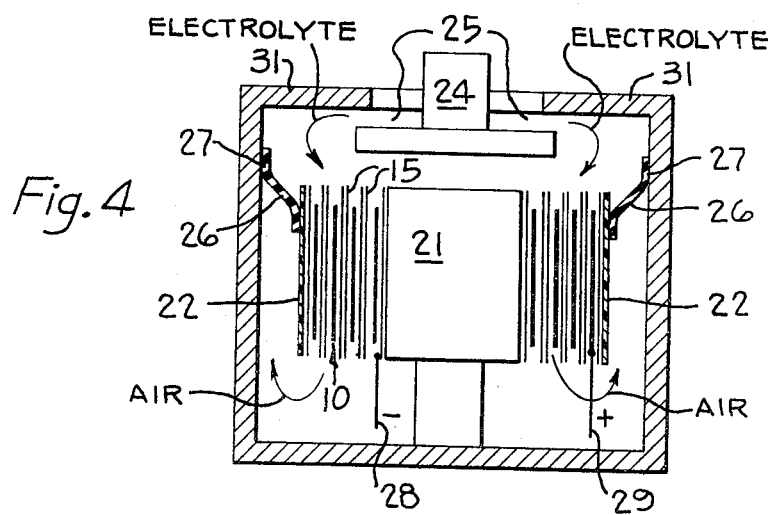

April 28, 1970         D. B. COLBECK ET AL         3,508,971
                      WATER ACTIVATED BATTERY
Filed June 7, 1967                          2 Sheets-Sheet 2
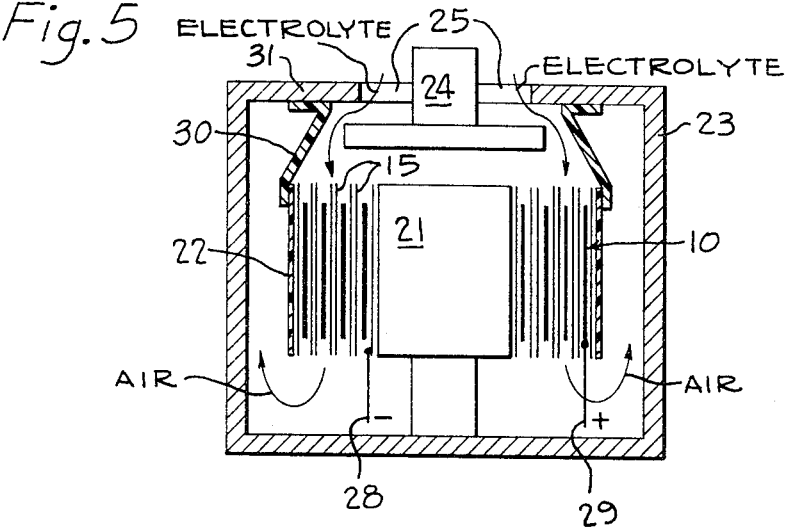
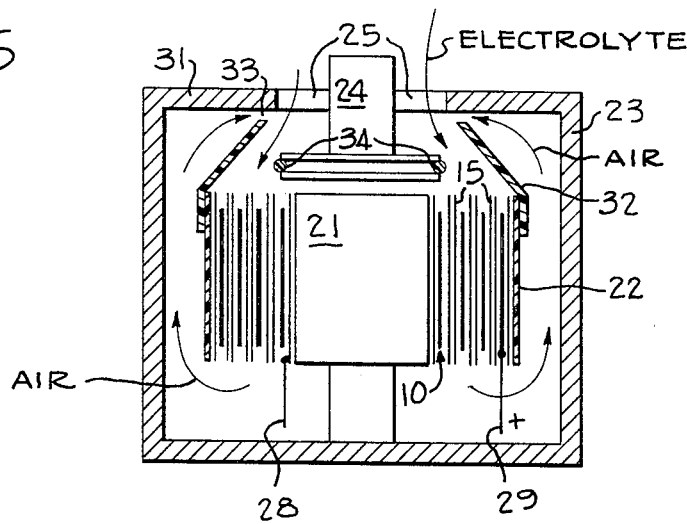

() # United States Patent Office 3,508,971
Patented Apr. 28, 1970

3,508,971
WATER ACTIVATED BATTERY
Derek B. Colbeck and Thomas H. Purcell, Jr., Raleigh, N.C., assignors, by mesne assignments, to ESB Incorporated, Philadelphia, Pa., a corporation of Delaware
Filed June 7, 1967, Ser. No. 644,271
Int. Cl. H01m 7/00, 21/12, 3/00
U.S. Cl. 136—90   11 Claims

ABSTRACT OF THE DISCLOSURE

A water activated battery having improved rapid activation as a result of an electrolyte-directing means positioned between the battery chamber wall and the electrode-separator assembly, near an electrolyte entry port at the top of the battery chamber and spaced a substantial distance from the bottom of the battery chamber. The electrolyte-directing means prevents electrolyte from entering the space between the electrode-separator assembly and the battery chamber sidewall and thereby provides space to accommodate air pushed from between the electrodes by the electrolyte. Provision of the air space overcomes the problem of air entrapped between the electrodes which impairs activation of the battery. The electrolyte-directing means may be firmly bonded to the chamber wall, the electrode-separator assembly or both. Silver chloride and magnesium are generally the positive and negative active materials.

BACKGROUND OF THE INVENTION

Water activated batteries are conventional power sources which are often used to power devices such as torpedoes, emergency signaling apparatus and sonobuoys. One of the principal requirements of this type of battery is that it should be capable of very rapid activation, i.e. provide operating voltage or potential rapidly when contacted by electrolyte. In some devices, design requirements make it necessary to use a battery having only an electrolyte entry port with no separate electrolyte exit port. It has been found that this type of battery may be slow to activate and its activation time may be inconsistent. As a result of this activation problem, these batteries are unreliable and their utility has been severely limited.

SUMMARY OF THE INVENTION

The general object of this invention is to provide a deferred action, water activated battery which is capable of very rapid activation. Other objects and advantages of the invention may be determined from the following description of the invention.

It has been discovered that the cause of slow and inconsistent activation of deferred action, water activated batteries which have only an electrolyte entry port with no separate electrolyte exit port is entrapped air between the active, working surfaces of the electrodes. The electrolyte floods into the battery chamber through the entry port causing the air in the chamber to form pockets between the electrodes. The electrode surface in contact with the air cannot react and this impedes activation at least during the initial, critical seconds of discharge.

In accordance with this invention, the entrapped air problem has been overcome by providing electrolyte-directing means between the outer surface of the electrode-separator assembly and the wall of the battery chamber, said electrolyte-directing means being located near the electrolyte entry port and spaced a substantial distance from the bottom of the battery chamber. The electrolyte-directing means may be firmly bonded to the wall of the battery chamber or the outer surface of the electrode-separator assembly, and if desired to both. The electrolyte-directing means prevents electrolyte from flowing into the space between the electrode-separator assembly and the battery chamber side wall, and in this manner a space is provided for the air which is forced from between the electrodes by the electrolyte. When the electrolyte-directing means is firmly bonded to only one surface, the compressed air pressure may become great enough to exceed the counter force of the electrolyte flooding through the entry port, and the air can escape around the edge of the electrolyte-directing means which is not firmly attached.

Another feature of this invention is that the outer surface of the electrode-separator assembly is not a working surface, and it is conventional practice to coat the outer surface with an electrically insulating, electrolyte resistant material. As a result, the provision of an air space between this outer surface and the chamber wall does not reduce the capacity of the battery.

BRIEF DESCRIPTION OF THE DRAWINGS

FIGURE 1 is a front elevation view of a typical water activated battery positive electrode-separator assembly with a portion in section to illustrate the collector plate.

FIGURE 2 is a top sectional view of an uncoiled, two-cell, series connected electrode assembly which may be used in a water activated battery having a spiral construction.

FIGURE 3 is a top sectional view of a water activated battery having a spiral construction.

FIGURE 4 is a side sectional view of a spiral, water activated battery having an electrolyte-directing device in accordance with this invention, with the electrodes being symbolically illustrated for clarity.

FIGURE 5 is a side sectional view of a spiral, water activated battery having an alternate form of an electrolyte-directing device in accordance with this invention, with the electrodes being symbolically illustrated for clarity.

FIGURE 6 is a side sectional view of a spiral, water activated battery having still another form of an electrolyte-directing device in accordance with this invention, with the electrodes being symbolically illustrated for clarity.

DETAILED DESCRIPTION

A more detailed description of this invention is available by referring to the drawings which illustrate water activated batteries and their parts. Identical parts in the several drawings are identified by the same number. FIGURE 1 represents a typical positive electrode-separator assembly 10 comprising a positive active material 11 such as silver chloride or lead chloride placed on both sides of a collector plate 12 such as silver foil. A cotton thread separator 13 is wrapped around the positive electrode to separate it from the negative electrodes placed on both sides thereof, permitting the electrolyte to have access to the active electrode surfaces. The end of the positive electrode which is not used for making electrical connection is coated with a polyester resin 14, such as a polyterephthalate resin, in the form of an adhesive tape.

Silver chloride is generally used as the positive active material and is available as strip material which may be rolled to the desired thickness. Silver chloride is a poor electrical conductor, and therefore, it is preferred to chemically reduce the surface to form a porous silver layer which carries the current from the reaction site to the collector plate. In some cases, lead chloride or cuprous chloride can be substituted for the silver chloride to reduce the cost of the battery, though silver chloride provides higher cell voltage and energy density, and the current density generally can be higher when using silver chloride.

In FIGURE 2, two positive electrodes constructed as in FIGURE 1 are shown between negative electrodes 15 in two series connected cells. This type of electrode construction and connection is suitable for spiral batteries, though this figure illustrates the electrodes in uncoiled form. The negative electrodes are generally prepared from magnesium or magnesium alloyed with minor amounts of aluminum and zinc. It is also possible to use aluminum and zinc as negative active material. The negative electrodes 15 of one cell are connected to the positive electrode-separator assembly 10 of the other cell by means of a rivet 16. The unconnected end of the positive electrode serves as the positive terminal 17, and the unconnected end of the negative electrode serves as the negative terminal 18 comprising a rivet 19 and a negative tab 20 which may be silver foil.

FIGURE 3 illustrates a spiral battery utilizing the electrode construction and connection shown in FIGURE 2. The two cell electrode assembly is wound about a winding core 21 which may comprise a linen filled phenolic resin. The electrode assembly is held in place by a nonconductive insulating material 22, such as a polyester resin (Mylar), in the form of an adhesive tape which is wound around the entire outside surface of the electrode assembly. The adhesive tape 22 is also placed between the two electrode assemblies to insulate them from each other in order to prevent short circuits within the battery.

Three alternate forms of this invention as applied to a spiral, water activated battery are illustrated in FIGURES 4, 5 and 6. In FIGURE 4, a metallic battery chamber, having a side wall 23, houses a winding core 21 about which is wound an electrode assembly comprising a positive electrode-separator assembly 10 inserted between negative electrodes 15. A polyester adhesive tape 22 is wrapped around the outside of the electrode assembly. At the top of the battery chamber there is a movable closure member 24 which can be released from contact with the battery chamber top wall 31 to form an electrolyte entry port 25. It should be noted that there is no separate electrolyte exit port. Electrolyte-directing means 26 is positioned between the outer surface of the electrode-separator assembly and the battery chamber side wall 23, near the electrolyte entry port and spaced a substantial distance from the bottom of the battery chamber.

The electrolyte-directing means 26 comprises a rubber (Neoprene) gasket which is securely bonded to the adhesive tape 22 surrounding the electrode assembly and is in contact with the side wall 23 of the battery chamber. The electrolyte-directing means 26 functions by directing the electrolyte to the spaces between the electrodes and providing an air space between the adhesive tape 22 and the chamber side wall 23. In the absence of electrolyte-directing means 26, the electrolyte floods between the tape and the chamber side wall, trapping the air in the spaces between the electrodes. In this particular construction, the end 27 of the electrolyte directing means is not firmly attached to the chamber side wall 23, and if the compressed air pressure exceeds the force of the electrolyte entering the chamber, air can escape around the end 27. Lead wires 28 and 29 make connection with the negative and positive terminals respectively.

FIGURE 5 illustrates an alternate form of this invention. In this embodiment, the electrolyte-directing means 30 comprises a cone configuration which is firmly bonded to both the adhesive tape 22 and the top wall 31 of the battery chamber. The electrolyte-directing means 30 may be made of plastic or other suitable material.

FIGURE 6 illustrates a third and preferred type of electrolyte-directing device. In this embodiment of the invention, the electrolyte-directing means 32 comprises a cone configuration which is firmly bonded only to the adhesive tape 22. The electrolyte-directing means 32 is slightly spaced from the top wall 31 of the battery chamber forming an opening or slot 33. In this manner the incoming electrolyte creates a suction at the slot 33 which acts as a venturi and draws the air from under the electrode-separator assembly. This may result in a mixture of air and electrolyte in the cell, but only a small amount is air and it does not impair the activation of the electrodes. In fact, it has been found that this type of electrolyte-directing means provides improved rapid activation.

In addition, FIGURE 6 also illustrates a different means for closing the battery chamber. As shown in FIGURES 4 and 5, the movable closure member 24 is overlapped by the top wall 31 of the battery chamber and the chamber may be closed by bringing closure member 24 into contact with the top wall 31. In the construction shown in FIGURE 6, the movable closure member 24 fits tightly within the entry port 25 in the top wall 31, and the chamber is sealed by means of a resilient O-ring 34 placed in the perimeter of the closure member 24.

The following examples demonstrate the improvement in rapid activation achieved by incorporating an electrolyte-directing means in a spiral battery in accordance with this invention.

Example I

Four spiral silver chloride-magnesium, water activated batteries were tested for rapid activation by discharging them with cold (32° F.), low salinity (1.05%) seawater electrolyte, the battery having been preconditioned at 0° F. Activation was determined by recording the battery voltage one second after contact with the aqueous electrolyte. In two of the batteries, there was no electrolyte-directing means, and in one of these the one second voltage was 1.7 v. and the other had a one second voltage of 1.8 v.

The other two batteries were made in accordance with this invention, and they contained a neoprene gasket-type electrolyte-directing means as illustrated in FIGURE 4. One of these batteries, with the invention, had a one second voltage at 2.5 v. and the other had a one second voltage of 2.3 v. The improvement in rapid activation provided by the invention was substantial.

Example II

Eight spiral silver chloride-magnesium, water activated batteries of conventional design (no electrolyte-directing means) and eight identical batteries having a cone-shaped electrolyte-directing means as shown in FIGURE 6 were tested for rapid activation by discharging them with 32° F., low salinity (1.05%) sea-water electrolyte. Activation was determined by recording the battery voltage one second after contact with the seawater electrolyte.

The eight batteries of conventional design yielded an average one second voltage of 1.71 volts, and the eight batteries having the electrolyte-directing means yielded an average one second voltage of 2.74 volts. This represented a significant improvement in rapid activation performance.

Whereas this invention has been described and illustrated with spiral, water activated batteries, it is also useful in other types of water activated batteries. As previously indicated, this invention is particularly useful in water activated batteries having only an electrolyte entry port with no separate electrolyte exit port.

Having completely described this invention, what is claimed is:

1. In a water activated battery comprising a battery chamber, a positive electrode-negative electrode-separator assembly spaced from said battery chamber, and an electrolyte entry port at the top of said battery chamber so that electrolyte passing through the entry port flows into the top of the electrode-separator assembly, the improvement comprising an electrolyte-directing means for directing electrolyte into the top of the electrode-separator assembly, said electrolyte-directing means positioned between the battery chamber wall and the positive electrode-negative electrode-separator assembly, near the electrolyte entry port and spaced a substantial distance from the bottom of the battery chamber, said electrolyte-directing means surrounding the electrode-separator assembly and being firmly bonded to either the chamber wall or the electrode-separator assembly, whereby electrolyte passing through the entry port is prevented from entering the space between the electrode-separator assembly and the battery chamber side wall from the top of said space and thereby providing a space to accommodate the air pushed from between the electrodes by the electrolyte entering the top of the electrode-separator assembly.

2. A water activated battery in accordance with claim 1 in which said positive electrode-negative electrode-separator assembly is surrounded by a nonconductive insulating material in contact with a surface of one of said electrodes and said electrolyte-directing means is firmly bonded to said insulating material surrounding the electrode-separator assembly and is in contact with said chamber wall.

3. A water activated battery in accordance with claim 2 in which said electrolyte-directing means is firmly bonded to both said chamber wall and said insulating material surrounding the electrode-separator assembly.

4. A water activated battery in accordance with claim 1 in which said electrolyte-directing means is firmly bonded to said chamber wall.

5. A water activated battery in accordance with claim 1 in which said positive electrode is silver chloride and said negative electrode is magnesium or a magnesium alloy.

6. A water activated battery in accordance with claim 1 in which said positive electrode-negative electrode-separator assembly is surrounded by a nonconductive insulating material in contact with a surface of one of said electrodes and said electrolyte-directing means is firmly bonded to said insulating material surrounding the electrode-separator assembly and is slightly spaced from the top wall of said battery chamber.

7. In a spiral water activated battery comprising a battery chamber, a spirally wound positive electrode-negative electrode-separator assembly spaced from said battery chamber, a non-conductive insulating material covering the outer surface of the electrode-separator assembly, and and electrolyte entry port at the top of said battery chamber so that electrolyte passing through the entry port flows into the top of the electrode-separator assembly, the improvement comprising an electrolyte-directing means for directing electrolyte into the top of the electrode-separator assembly, said electrolyte-directing means positioned between the battery chamber wall and the insulating material covering the electrode-separator assembly, near the electrolyte entry port and spaced a substantial distance from the bottom of the battery chamber, said electrolyte-directing means surrounding the electrode-separator assembly and being firmly bonded to either the chamber wall or the insulating material covering the electrode-separator assembly, whereby electrolyte passing through the entry port is prevented from entering the space between the electrode-separator assembly and the chamber side wall from the top of said space and thereby providing a space to accommodate the air pushed from between the electrodes by the electrolyte entering the top of the electrode-separator assembly.

8. A spiral, water activated battery in accordance with claim 7 in which said electrolyte-directing means is firmly bonded to said insulating material covering the electrode-separator assembly and is in contact with said chamber wall.

9. A spiral, water activated battery in accordance with claim 7 in which said electrolyte-directing means is firmly bonded to both said chamber wall and said insulating material covering the electrode-separator assembly.

10. A spiral, water activated battery in accordance with claim 7 in which said positive electrode is silver chloride and said negative electrode is magnesium or a magnesium alloy.

11. A spiral, water activated battery in accordance with claim 7 in which said electrolyte-directing means is firmly bonded to said insulating material covering the electrode-separator assembly and is slightly spaced from the top wall of said battery chamber.

References Cited

UNITED STATES PATENTS

| | | | |
|---|---|---|---|
| 2,992,289 | 7/1961 | Meyers | 136—90 |
| 3,281,271 | 10/1966 | Comanor et al. | 136—13 |
| 3,291,644 | 12/1966 | Gray et al. | 136—90 |
| 3,326,724 | 6/1967 | Armitage | 136—13 |

CARL D. QUARFORTH, Primary Examiner

H. E. BEHREND, Assistant Examiner

U.S. Cl. X.R.

136—13, 100, 162